United States Patent
Denby

(10) Patent No.: US 6,591,864 B1
(45) Date of Patent: Jul. 15, 2003

(54) PRESSURE RELEASE VALVE

(76) Inventor: James Edward Denby, 1 St. James Terrace, Selby, North Yorkshire YO8 4HL (GB)

( * ) Notice: Subject to any disclaimer, the term of this patent is extended or adjusted under 35 U.S.C. 154(b) by 0 days.

(21) Appl. No.: 09/869,870

(22) PCT Filed: Jan. 6, 2000

(86) PCT No.: PCT/GB00/00004

§ 371 (c)(1),
(2), (4) Date: Jul. 23, 2001

(87) PCT Pub. No.: WO00/40881

PCT Pub. Date: Jul. 13, 2000

(30) Foreign Application Priority Data

Jan. 6, 1999 (GB) ............................. 9900289

(51) Int. Cl.[7] ........................ F16K 15/02; F16K 31/06
(52) U.S. Cl. ......................... 137/528; 137/39; 251/65
(58) Field of Search ............................ 137/38, 39, 511, 137/528; 251/65

(56) References Cited

U.S. PATENT DOCUMENTS

| | | | | |
|---|---|---|---|---|
| 4,349,042 A | * | 9/1982 | Shimizu ....................... 137/39 |
| 4,489,754 A | * | 12/1984 | Seessle et al. ............... 137/528 |
| 5,320,136 A | * | 6/1994 | Morris et al. ................ 137/528 |
| 5,611,895 A | * | 3/1997 | Genser ......................... 202/182 |
| 6,000,417 A | * | 12/1999 | Jacobs ..................... 137/528 X |

* cited by examiner

Primary Examiner—Kevin Lee
(74) Attorney, Agent, or Firm—Rohm & Monsanto, PLC

(57) ABSTRACT

A pressure (1) release valve is disclosed ideally for use on petrol tankers which can rollover in an accident. There is a requirement for such valves both to become sealed in the event of a rollover to prevent the escape of volatile and flammable fluid from within the tanker, and also to allow for the venting of gas above the fluid within the tanker under normal operating conditions. The valve comprises a movable plunger (24) and a fixed seat (32) which can move axially towards and away from each other to open and close the valve. One or other of valve seat and plunger is provided with magnetic inserts (23), while the alternate component is ferromagnetic so that magnetic attraction betwixt the two components acts to bias the valve towards a closed condition. Once the pressure differential across the valve attains a predetermined and variable level (if the displacement of the magnets can be varied within the said component, the magnetic attraction can be varied), then the plunger is separated from the valve seat, the valve is opened, and pressure can be released therethrough. The valve is also optionally provided with a manual pressure release means (27) which is actuable even in the event of a rollover to allow for safe draining of the fluid from within the tanker.

15 Claims, 1 Drawing Sheet

PRESSURE RELEASE VALVE

FIELD OF THE INVENTION

This invention relates to a pressure release valve fitted to a container, and more specifically to a gas pressure release valve which allows automatic release of pressure within the container in the event of said pressure rising above a predetermined level, yet remain closed when the container pressure is below said predetermined level.

Although this invention refers almost exclusively to a pressure valve for a road or rail tanker carrying volatile liquid, and particularly to a road tanker for transporting petrol, it will be appreciated by those skilled in the art that the invention could also include other storage arrangements for the containment of any volatile liquid or hazardous chemical. Indeed it is already been proposed to use valves of the present invention to replace those valves already in existence on vent stacks of static tanks beneath petrol garages.

DESCRIPTION OF RELATED ART

Pressure valves are commonly employed on the top of containers used for the storage or transportation of volatile liquids, particularly on the top of tankers for the transportation of petrol. Volatile liquids evaporate by definition, and the vibration and movement of a volatile liquid within a tanker is often sufficient to cause such evaporation. Furthermore, slight increases in the ambient temperature can have a substantial effect on the degree to which evaporation of a volatile liquid occurs. In any event, evaporation of a volatile liquid in a closed container results in a build-up of pressure in that container. This is clearly disadvantageous, especially when the volatile liquid is highly inflammable, and in extreme circumstances the increase in pressure could result in an explosion.

Pressure release valves are therefore incorporated in those containers to ensure automatic venting of pressure within the container before said pressure rises to a dangerous level. The valve acts to maintain a tolerable pressure within the container until the pressure reaches a predetermined level at which point the valve automatically opens to release the pressure from within the container. When the pressure within the tanker falls again to a tolerable level, the valve then automatically closes to return the container to a concealed state thereby preventing unnecessary release of hydrocarbons into the environment.

Conventionally, pressure valves on tankers consist of a plunger which rests on a valve seat, the action of gravity on the plunger and the corresponding reaction of the valve seat being generally sufficient to form a seal therebetween. Additional springs may bias the plunger towards and away from the valve seat, and accordingly a desired pressure setting of the valve may be achieved such that venting occurs once the pressure within the container reaches a predetermined level.

In practise however, as the pressure within the container increases above the ambient pressure outside the container and thus exteriorly of the plunger of the valve, the plunger begins to rise and any seal between the valve seat and the plunger is broken. This results in unnecessary release of petrol vapour into the environment. The conventional valve is in fact so unreliable that periodic testing of the valves currently provided on petrol tankers almost invariably shows that the valve is faulty which results in the routine replacement of all such pressure valves on that tanker. This inevitably results in increased expense to the owner of the petrol tanker.

In addition to the unnecessary venting of petrol stored in tankers, the possibility of petrol spillage from the tanker through the pressure valves in the event of an accident is also an important consideration.

Conventional pressure valves on the top of tankers have a roll-over mechanism, which acts to seal off the pressure valve in the event of a tanker rolling over, as is common in an accident. When the tanker is overturned, the pressure release valve is automatically shut off by said roll-over mechanism, and the liquid is therefore prevented from leaking out. However, in the event of an accident, there is a requirement to drain the inflammable fluid from the tanker, and such a feature is not currently provided on existing valves. Henceforth, spillage of the inflammable liquid is almost inevitable as a suitable hose is connected to the pressure valve to drain fluid therethrough. It can be appreciated that such spillage of a flammable liquid is potentially lethal.

There are disclosed in WO9857082, FR2252523, U.S. Pat. No. 4,489,754, DE1229927 and U.S. Pat. No. 4,874,012 a number of valves incorporating magnets as a means of attracting or repelling different portions of the valve. In particular, WO9857082 discloses a magnetic annular valve seat which magnetically retains a spherical ball valve in a closed seal against the seat when the fluid pressure beneath the ball valve is below a predetermined value. FR2252523 describes a magnetic valve having an outer shell from which a cruciform structure depends and having an annular plastic insert therein which provides an annular valve seat against which a ferromagnetic disc held within the cruciform structure contacts to close the valve. The disc is magnetically attracted to a permanent magnet mounted in the middle of the shell between arms which traverse said shell. The remaining documents also describe magnetic valves, but only DE1229927 discloses a valve having one valve component magnetically attracted to the other and which also includes a manual release for displacing the valve component out of a sealing condition to re-open the valve.

It is an object of the invention to provide a pressure valve for a tanker or storage container which allows venting of a contained product only when the pressure within the tanker or container reaches a pre-determined level to prevent the unnecessary release of evaporated product into the environment.

It is a further object of the invention to provide a pressure release valve through which a tanker or storage container can be both vented and drained without resulting in spillage of the liquid contained thereby, notwithstanding the particular orientation of the said container.

SUMMARY OF THE INVENTION

According to the invention there is provided a pressure release valve comprising a first movable portion and a fixed portion, said valve allowing fluid to flow between the first movable portion and the fixed portion when the first movable portion adopts a first disposition with respect to the fixed portion, and prevents fluid flow when in a second disposition, said first movable portion capable of moving relative to the fixed portion when a pressure differential across the valve reaches a predetermined value, one or other of the first movable or fixed portion having magnets which magnetically attract the alternate portion with a force which is sufficient to prevent relative displacement of the portions when the pressure differential across the valve is below said predetermined value and characterised in that the first movable portion is provided with manual release means comprising a vacuum seal plate which sealingly contacts the first movable portion and can be manually moved relative thereto to break the seal to allow fluid flow through the valve regardless of the pressure differential thereacross.

Preferably, a rollover mechanism is additionally provided underneath the said valve which acts in the event of a rollover to displace a seal plate underneath the valve into sealing contact with a shoulder underneath said valve, and further characterised in that said manual release means communicates with said seal plate to displace same and break both the seal formed between the seal plate against and the valve shoulder and between the vacuum seal plate and the first movable portion of said valve.

Preferably the magnetic attraction between the portions is adjustable such that relative displacement of the portions may be prevented when the pressure differential across the valve is below a variety of predetermined values.

Preferably the valve comprises a movable plunger and a fixed seat having at least a partial ferromegnetic characteristic, said plunger being provided with magnets therein or being magnetised so as to magnetically attract the seat.

Preferably the seat is annular and either plunger or seat comprises an elastomeric seal compressed between the said seat and said plunger thus sealing the valve and preventing fluid to flow therethrough when the pressure differential there-across is below one of said predetermined values.

Preferably, the valve is provided as a vent for a closed container adapted to carry volatile liquid.

Most preferably, the valve is incorporated in a petrol tanker.

In a most preferred embodiment the magnets are sintered neodymium-iron-boron magnets but it is to be noted that a number of other types of magnets can be used that will give a similar performance.

Ideally, the magnetic attraction between the portions diminishes substantially as the portions are displaced relative to one another. This not only ensures that the valve allows fluid to flow therethrough only when the pressure differential thereacross is at precisely the predetermined value and not at some lower value, but also ensures that once the magnetic attraction has been broken, and the portions moved relatively to one another, the valve allows a greater flow therethrough. Prior art valves rely on gravitational and spring bias effects to close the valve exert a constant and/or linearly increasing restoring force on the respective portions dependent on their relative displacement, whereas in the valve of the present invention, the restoring force between the portions is substantially diminished as they are moved apart, with practically only gravitational effects on the plunger acting to restore the valve to its closed condition. Henceforth, far superior venting can be achieved with the valve of the present invention.

In a preferred arrangement, and in circumstances where the predetermined pressure differential across the valve must be particularly high before venting occurs, the valve seat is magnetised or is provided with magnetic means which attract either or both of the magnets in the plunger and the plunger itself.

Most preferably in the case where the valve is to be used by a petrol tanker, the magnetic attraction is broken and the valve portions separate when the pressure differential across the valve is 70 m/bar.

Preferably, said pressure valve has a roll-over mechanism incorporated therein, as described in our co-pending application of even date.

A specific embodiment of the invention will now be described by way of example, with reference to the accompanying drawing wherein:

DETAILED DESCRIPTION OF THE INVENTION

Figure 1A:
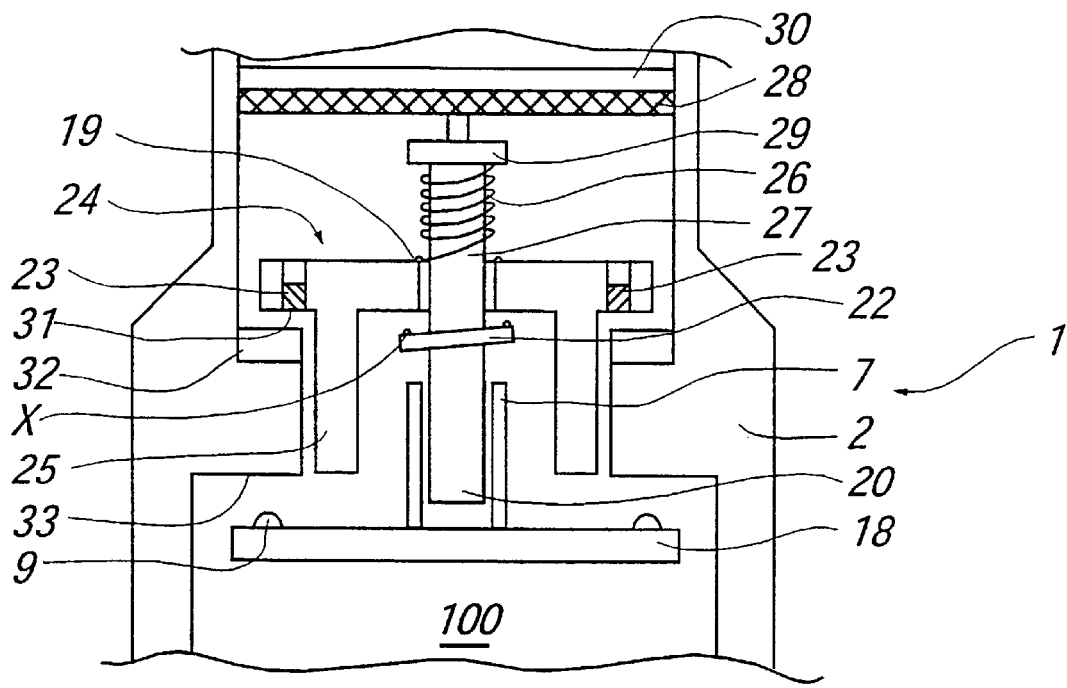
FIG. 1A shows a cross-sectional view of a valve assembly according to the present invention with a roll-over mechanism

Referring firstly to FIG. 1a, there is illustrated a pressure valve 1 provided with a roll-over mechanism which in use is fitted to a tanker carrying petrol (not shown). The pressure valve has a cylindrical outer sleeve 2, a plunger 24, and a valve seat 32. The sleeve 2 defines a cavity 100 which communicates with the tanker body and the pressure in the cavity 100 is thus identical to that above the fluid within the tanker, whether petrol or otherwise. The outer sleeve 2 is provided with a flame arresting gauze 28 in its uppermost portion and a retainer ring 30 maintains the position of the gauze 28 within the outer sleeve 2.

The plunger 24 has one or more plunger magnets 23 within the body 25 thereof. The plunger magnets 23 sit on the optionally magnetised seat 32 which is of a ferromegnetic material to form a seal between the underside shoulder of the plunger and the annular valve seat. An O-ring seal 31 is optionally provided to increase the efficacy of the seal between these two components.

A pressure build-up in the tanker and thus the cavity 100 below the plunger 24 arising as a result of evaporation of petrol in the tanker, exerts an upward force on the plunger 24, provided that the ambient air pressure externally of the tank and thus the valve 1 is lower than that within the cavity such that there is a pressure differential across the valve. At the point when the upwards pressure force exceeds the magnetic attraction between the plunger magnets 23 and the valve seat 32, the seal is broken and the plunger 24 rises to allow the pressure to be released, thereby venting the tanker.

The plunger 24 has a central aperture 19 with a central rod 27 passing through it. A spring 26 is disposed around central rod 27 between the upper surface of the plunger 24 and the free end of the central rod 27, and is retained on said central rod by means of a circlip 29. The spring therefore biases a vacuum seal plate 22 attached to the central rod 27 against the underside of the plunger 24 and a seal is effected between these components by means of an o-ring seal X.

A roll-over mechanism (not shown, but described fully in our co-pending application of even date) is disposed beneath a roll-over seal plate 18 provided with a hollow cylindrical boss 7 which receives the free end of the central rod 20. The said mechanism is disposed within the valve 1 and beneath the roll-over seal plate such that under conventional circumstances, when the tanker is in its correct orientation, the seal plate 18 rests on said mechanism and a small amount of vertical play of the vacuum seal plate is permitted. In the event of a roll-over incident, the roll-over mechanism activates to push roll-over plate 18 upwardly to form a seal with the inner shoulder 33 of the outer sleeve 2, thereby preventing spillage of petrol through the pressure valve.

A secure seal between the said inner shoulder 33 and the roll-over seal plate 18 is effected by means of a further O-ring seal 9 which is clamped between the said components during a roll-over incident.

In an accident situation where the roll-over mechanism has been activated, the flame arresting gauze 28 and the retaining ring 30 can be removed and a hose can be fitted over the uppermost portion of the outer sleeve 2. The hose is provided with a fitting which pushes down on central rod 27 and spring 26, thereby pushing down the roll-over seal plate 18 which allows fluid within the tanker to be drained through the valve and into the hose in a safe and spillage-free manner. The configuration of the valve components during a roll-over incident is such that there may exist a small clearance between the base of the hollow cylindrical boss 7 and the free end 20 of the central rod 27 when the roll-over plate 18 is clamped against the inner shoulder 33 by the roll-over mechanism. This prevents any accidental drainage of fluid from the rolled-over tanker which would occur if the circlipped end of the central rod 27 was accidentally depressed and the free end thereof contacted the base of the hollow cylindrical boss 7.

Figure 1B:
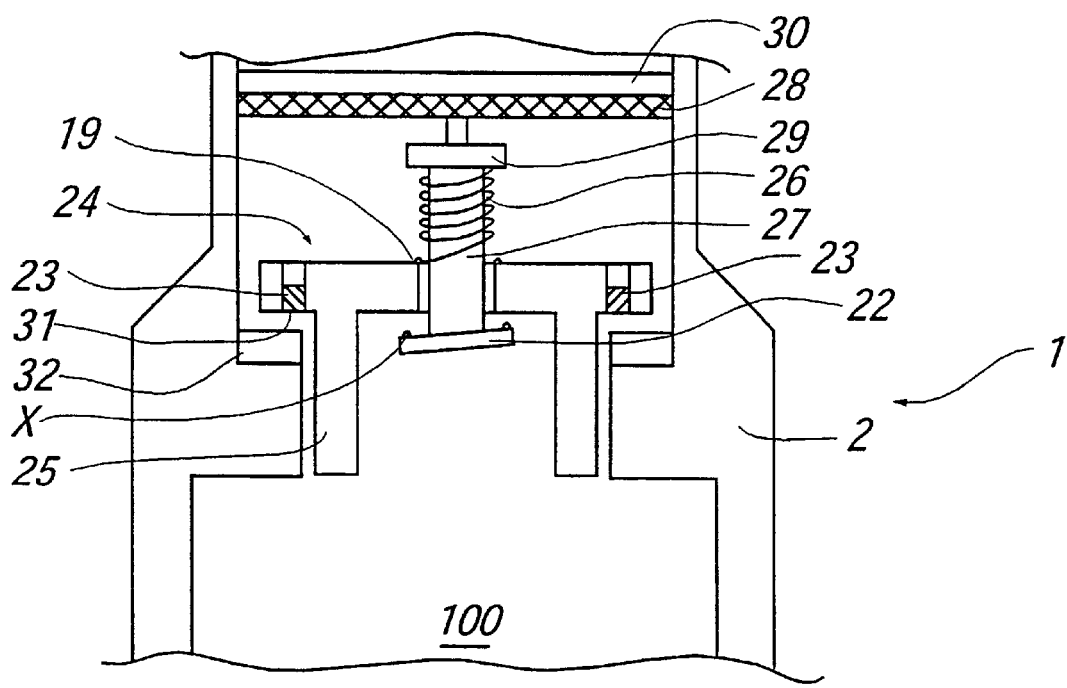
FIG. 1B shows a cross-sectional view of a valve assembly according to the present invention on a static installation.

Referring to FIG. 1B, there is illustrated a pressure valve 1 which is broadly similar to FIG. 1A, with the exception that there is no roll-over mechanism and is therefore more suitable for use on a static installation.

What is claimed is:

1. A pressure release valve (1) comprising a first movable portion (24) and a fixed portion (32), said valve allowing fluid to flow between the first movable portion and the fixed portion when the first movable portion adopts a first disposition with respect to the fixed portion, and prevents fluid flow when in a second disposition, said first movable portion capable of moving relative to the fixed portion when a pressure differential across the valve reaches a predetermined value, one of the first movable or fixed portion having magnets (23) which magnetically attract the alternate portion with a force which is sufficient to prevent relative movement of the portions when the pressure differential across the valve is below said predetermined value and wherein the first movable portion is provided with manual release means (22,27) comprising a vacuum seal plate (22) which sealingly contacts the first movable portion and can be manually moved relative thereto to break the seal to allow fluid flow through the valve regardless of the pressure differential thereacross.

2. A pressure release valve (1) according to claim 1 wherein a rollover mechanism is additionally provided underneath the valve which acts in the event of a rollover to displace a seal plate (18) underneath the valve into sealing contact with a shoulder (33) underneath said valve, and further wherein manual release means (22, 27) communicates with said seal plate to displace same and break both the seal formed between the seal plate against the valve shoulder and between the vacuum seal plate (22) and the first movable portion (24) of said valve.

3. A valve (1) according to claim 2 wherein the magnetic attraction between the portions is adjustable such that relative displacement of the portions may be prevented when the pressure differential across the valve is below a variety of predetermined values.

4. A valve (1) according to claim 3 wherein the magnetic attraction between the portions diminishes rapidly as the portions are displaced relative to one another.

5. A valve (1) according to claim 3 wherein the adjustment of magnetic attraction between said components is effected by adjusting the displacement in a depth or radial direction of the magnetic means within said one portion.

6. A valve (1) according to claim 2 wherein the first movable portion (24) is a movable plunger which creates a seal with a fixed seat (32) having at least a partial ferromagnetic characteristic, said plunger being provided with magnetic means (23) therein so as to magnetically attract the seat.

7. A valve according to claim 6 wherein the magnetic attraction is broken and the valve portions separate when the pressure differential across the valve is 70 mbar.

8. A valve according to claim 6 wherein the seat (32) is annular and either plunger (24) or seat comprises an elastomeric seal (31) compressed between the said seat and said plunger thus sealing the valve and preventing fluid to flow therethrough when the pressure differential thereacross is below one of said predetermined values.

9. A valve (1) according to claim 1 wherein the magnetic attraction between the portions is adjustable such that relative displacement of the portions may be prevented when the pressure differential across the valve is below a variety of predetermined values.

10. A valve (1) according to claim 9 wherein the adjustment of magnet attraction between said components is effected by adjusting the displacement in a depth of radial direction of the magnetic means within said one portion.

11. A valve (1) according to claim 1 wherein the first movable portion (24) is movable plunger which creates a seal with a fixed seat (32) having at least a partial ferromagnetic characteristic, said plunger being provided with magnetic means (23) therein so as to magnetically attract the seat.

12. A valve (1) according to claim 11 wherein the seat (32) is annular and either plunger (24) or seat (32) comprises an elastomeric seal (31) compressed between said seat and said plunger thus sealing the valve and preventing fluid to flow therethrough when the pressure differential there-across is below one of said predetermined values.

13. A valve (1) claim 11 wherein the valve seat (32) is magnetised or is provided with magnetic means which attract magnetic means in the plunger (24).

14. A valve (1) according to claim 1 wherein the magnetic means (23) are sintered neodymium-iron-boron magnets.

15. A valve according to claim 1 wherein the valve seat (32) is magnetised or is provided with magnetic means which attract magnetic means in the plunger (24).

* * * * *